United States Patent
Choi et al.

(10) Patent No.: US 10,565,174 B2
(45) Date of Patent: Feb. 18, 2020

(54) OPERATING METHOD FOR NON-VOLATILE MEMORY

(71) Applicant: INDUSTRY ACADEMIC COOPERATION FOUNDATION OF YEUNGNAM UNIVERSITY, Gyeongsangbuk-do (KR)

(72) Inventors: Gyu Sang Choi, Daegu (KR); Byung Won On, Jeollabuk-do (KR); Jabarov Elkhan, Seoul (KR)

(73) Assignee: INDUSTRY ACADEMIC COOPERATION FOUNDATION OF YEUNGNAM UNIVERSITY, Gyeongsangbuk-Do (KR)

(*) Notice: Subject to any disclaimer, the term of this patent is extended or adjusted under 35 U.S.C. 154(b) by 248 days.

(21) Appl. No.: 15/891,546

(22) Filed: Feb. 8, 2018

(65) Prior Publication Data

US 2018/0225312 A1    Aug. 9, 2018

(30) Foreign Application Priority Data

Feb. 9, 2017 (KR) .................. 10-2017-0018282

(51) Int. Cl.
| | | |
|---|---|---|
| *G06F 16/00* | (2019.01) | |
| *G06F 16/215* | (2019.01) | |
| *G06F 16/22* | (2019.01) | |
| *G06F 16/903* | (2019.01) | |
| *G06F 16/23* | (2019.01) | |

(52) U.S. Cl.
CPC ........ *G06F 16/215* (2019.01); *G06F 16/2246* (2019.01); *G06F 16/90339* (2019.01); *G06F 16/2365* (2019.01)

(58) Field of Classification Search
CPC .......... G06F 16/90339; G06F 16/2246; G06F 16/2365
See application file for complete search history.

(56) References Cited

U.S. PATENT DOCUMENTS

| | | | | |
|---|---|---|---|---|
| 8,930,375 | B2 * | 1/2015 | Dhuse | G06F 3/067 |
| | | | | 707/741 |
| 10,013,444 | B2 * | 7/2018 | Dhuse | G06F 11/10 |
| 10,067,969 | B2 * | 9/2018 | Rice | G06F 16/2282 |
| 2002/0078047 | A1 * | 6/2002 | Hollines, III | G06F 16/2246 |
| 2017/0212680 | A1 * | 7/2017 | Waghulde | G06F 11/1469 |

FOREIGN PATENT DOCUMENTS

KR    20140021793 A    2/2014

OTHER PUBLICATIONS

Joy Arulraj, Justin Levandoski, Umar Farooq Minhas, and Per-Ake Larson, "BZTree: A High-Performance Latch-free Range Index for Non-Volatile Memory", pp. 553-565, Jan. 2018, Proceedings of the VLDB Endowment. (Year: 2018).*

Shimin Chen and Qin Jin, "Persistent B+-Trees in Non-Volatile Main Memory", pp. 786-797, Proceedings of the VLDB Endowment, 2015. (Year: 2015).*

* cited by examiner

*Primary Examiner* — Cheryl Lewis
(74) *Attorney, Agent, or Firm* — Porzio Bromberg & Newman P.C.

(57) ABSTRACT

A non-volatile memory includes: at least one parent node; and at least one child node that stores a data object and has a variable size of n multiple of the parent node, n being a natural number, when a target child node to insert at least one new data object is fully filled, wherein the data objects of the target child node are split and reinserted into newly created at least one child node.

19 Claims, 6 Drawing Sheets

OPERATING METHOD FOR NON-VOLATILE MEMORY

CROSS-REFERENCE TO RELATED APPLICATIONS

This application claims the benefit under 35 U.S.C. 119(a) of Korean Patent Application No. 10-2017-0018282 filed on Feb. 9, 2017 in the Korean Intellectual Property Office, the entire disclosure of which is incorporated herein by reference for all purposes.

BACKGROUND

1. Field

The following description relates to an operating method for PCR*-tree of a non-volatile memory. In detail, it relates to an operating method for PCR*-tree of a non-volatile memory that applies a PCR*-tree data structure to a non-volatile RAM data structure to improve endurance, lifetime, and data processing performance.

2. Description of Related Art

Hard Disk Drives (HDDs) have been used as mainly used storage devices for computer systems for several decades, but recently there has been a change in this situation because of NAND flash memorys. In recent years, NAND flash memory based storage devices have been more used because of various advantages of higher performance compared to the HDDs, lower power consumption, higher reliability, and smaller form factor.

Since 2009, a market size of Solid State Drives (SSDs) is increasing dramatically every year. However, a NAND flash memory market share has been lower than an HDD market share so far because the NAND flash memories have disadvantages of higher cost but a similar performance of HDD in a specific operation such as random writes.

Meantime, it is anticipated that a Phase Change Memory (PCM) out of diverse nonvolatile RAMs will most likely substitute for the NAND flash memory, and a lot of semiconductor companies are conducting a research for commercialization with great time and effort.

In-memory Database with a Dynamic Random Access Memory (DRAM) is used to support quick decision-making. DRAM is volatile memory, so it is necessary to perform a regular backup to prevent data loss. However, if a power is lost before performing the backup, data will be lost.

PCM is a byte-addressable storage, and it is 2 to 4 times denser than DRAM. PCM also has much better read latency than a NAND flash memory, but it has endurance limitations.

The recent many application programs use spatial data such as location information, so it is important to store spatial data in a memory. R-tree is a well-known data structure that can handle spatial data, but it has a problem of performing a lot of writing operations and thus the memory's life is shortened.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a non-volatile memory includes: at least one non-leaf node; and at least one leaf node that stores a data object corresponding to the non-leaf node and has a variable size of n multiple of the non-leaf node, n being a natural number.

An operating method of the non-volatile memory includes: when a target leaf node to insert at least one new data object is fully filled, creating at least one leaf node; splitting data objects from a split index point in the target leaf node; and reinserting the split data objects into the created leaf node at once.

In another general aspect, a non-volatile memory includes: at least one parent node; and at least one child node that stores a data object and has a variable size of n multiple of the parent node, n being a natural number, when a target child node to insert at least one new data object is fully filled, in which the data objects of the target child node are split and reinserted into newly created at least one child node.

An operating method for a non-volatile memory includes: when a child node is full to insert at least one data object, designating a split index point of the child node based on the data object; creating a new child node; and moving all data objects starting from the split index point to the new node at once

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

An operating method for PCR*-tree of a non-volatile memory according to the present disclosure decreases the number of writes and spread them equally among all PCM cells in order to keep all cells usable as long as possible, and at the same time, improve performance.

Figure 1:
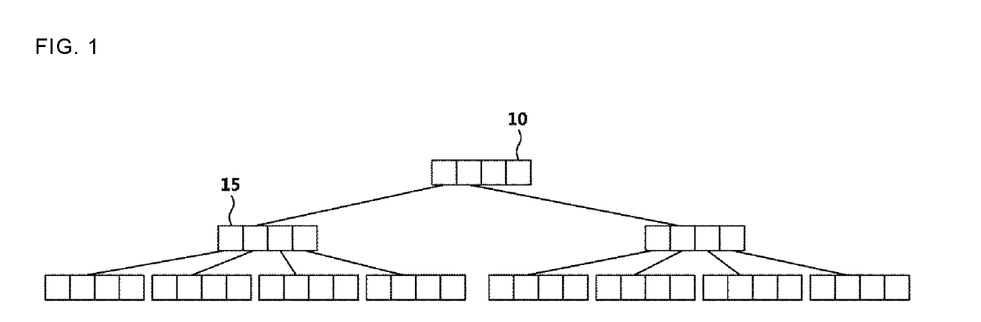
FIG. 1 is a diagram of an R-tree in a related art.
Figure 2:
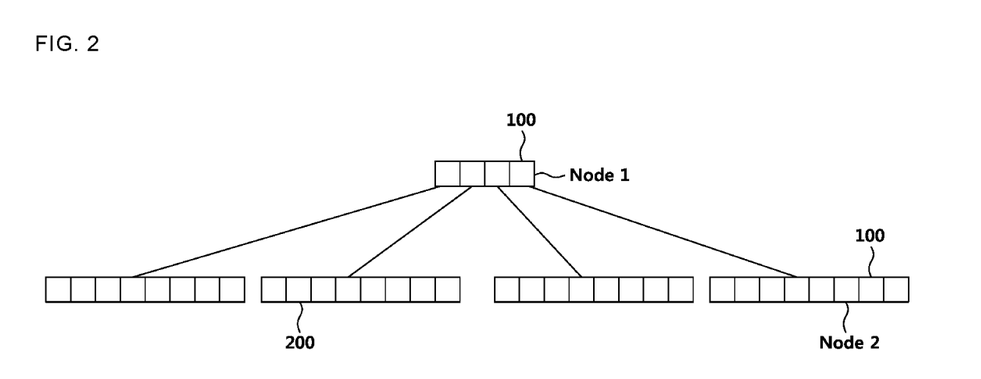
FIG. 2 is a diagram of a PCR*-tree in the present disclosure.

FIGS. 1 and 2 are diagrams of an example of the size of leaf nodes and a root node. In detail, FIG. 1 is a diagram of an R-tree of a related art, and FIG. 2 is a diagram of a PCR*-tree according to an example of the present disclosure.

A node needs to be sorted right before reinsert or split operation that deteriorates the performance. As all the elements are being stored in leaf nodes, the split or reinsert operation will initially be executed when the leaf node overflows.

PCR*-tree has several requirements. The root node has at least two children (unless it is a leaf). Every node has a child node between the minimum and maximum fill factors. All leaf nodes are located on the same levels.

R-tree uses the same maximum fill factor value for both intermediate node and leaf node, and accordingly the minimum fill factor value is half of the maximum fill factor value. R-tree split operation degrades performance as the algorithm needs to determine whether or not to reinsert an element or split it. However, in the case of PCR*-tree, the maximum fill factor value of leaf nodes is different from the maximum fill factor value of intermediate nodes. In initialization step, the maximum fill factor value for intermediate nodes, as well as for leaf nodes, are set. That is, the PCR*-tree increases the size of leaf nodes, compared to intermediate node size that will postpone the overflow in R-tree nodes.

Maximum fill factor values of an intermediate node and a leaf node may be configured in an initialization step, and FIGS. 1 and 2 illustrate an example of R-tree and PCR*-tree in which 32 data objects are stored, respectively.

As illustrated in FIG. 1, a root node 10, intermediate nodes 15, and leaf nodes 20 according to a related art have the same fill factor value of 4.

Therefore, four data objects may be written in each node. In order to retrieve a data object stored in the leaf nodes 20, the root node 10 and the intermediate nodes 15 may need to be passed. Since data objects are retrieved through two stages, it takes relatively long to retrieve data objects.

As illustrated in FIG. 2, in an example of an operating method for non-volatile memory, the size of leaf nodes 200 is variably configured. That is, the size of the leaf nodes 200 is n multiple of the size of a non-leaf node connected to the leaf nodes 200 (the root node 100 in FIG. 2), provided n is a natural number.

In detail, when the number of data objects included in the root node 100 is 4, the leaf nodes 200 are configured to have a size such as a two times of the root node 100 (that is, 8), three times (that is, 12), four times (that is, 16), and so on, so a plurality of data objects may be stored in one node. In FIG. 2, n is 2, so a fill factor value of the leaf nodes 200 is 8, and a fill factor value of the root node 100 is 4.

Accordingly, the PCR*-tree structure is more compact, as fewer intermediate nodes are required. One fill factor of the root node 100 is in charge of eight fill factors of the leaf nodes 200, so there is an effect that a data object retrieving time is shortened.

That is, if the size of a leaf node is greater than the size of an intermediate node and a root node, the execution of an OverflowTreatment function that splits or reinserts elements in a node may be postponed.

As illustrated in FIG. 2, since a tree of the example needs relatively less intermediate nodes, a data object retrieving time will be reduced. Although only a root node and leaf nodes are illustrated in the figure, an intermediate node may be disposed between the root node and leaf nodes.

Figure 3:
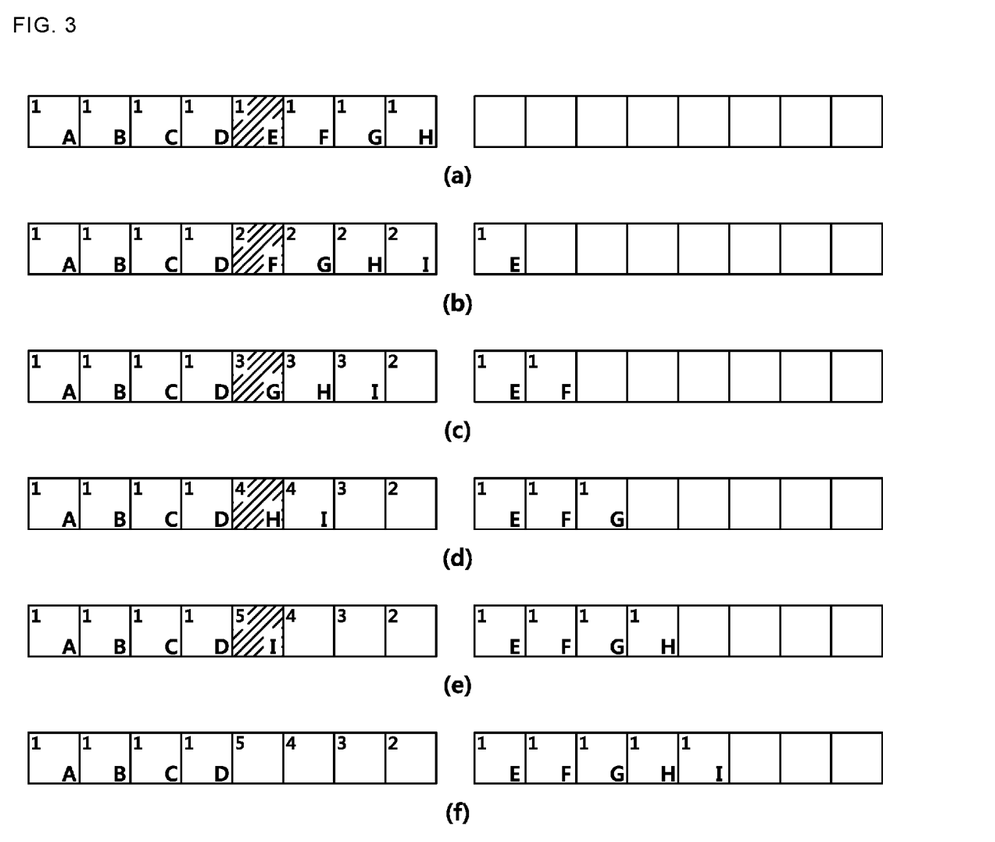
FIG. 3 is a diagram of node split in a related art.
Figure 4:
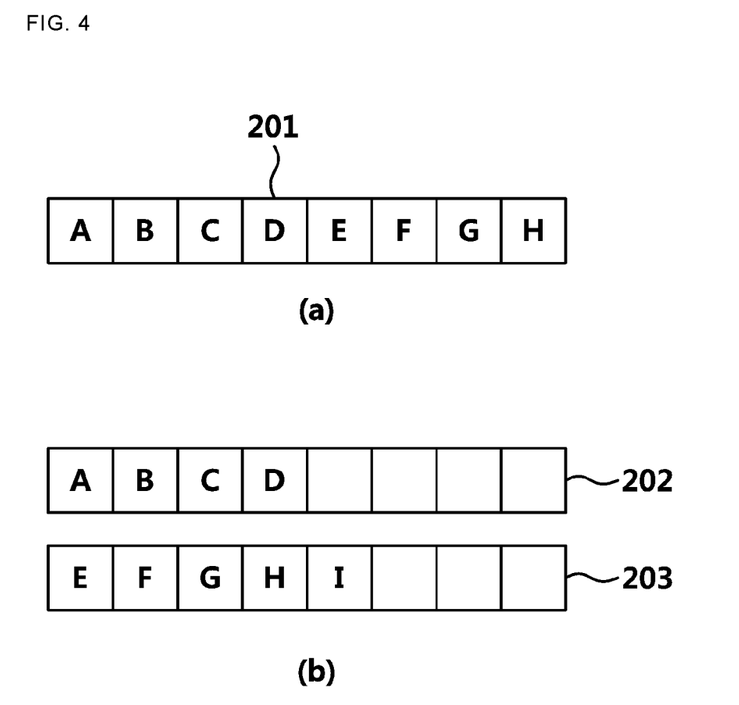
FIG. 4 is a diagram of an example of node split in the present disclosure.

FIG. 3 is a diagram of node split of a related art, and FIG. 4 is a diagram of node split of an example of the present disclosure. Cases illustrated in FIGS. 3 and 4 are examples of additionally inserting data object I into a full node whose maximum fill factor value is 8.

When a node is split because of a fully fill of data objects, it is necessary to find a split index that indicates from which data object of the node has to move to a newly created node.

As illustrated in FIG. 3, a split index—data object E—is somewhere in the middle of a node and a method of R-tree structure moves elements one by one from the split index point to a new node and the remaining ones move one step to the left to keep the node consistent. Thus, it has a problem of dramatically increasing the number of writes.

Specifically, the node is filled with the data objects A, B, C, D, E, F, G, H. When data object I is inserted in the node, it needs to be split and a split index is the fifth element—data object E—of the node. A numeral appearing in the top leftmost corner of each data object refers to the number of writes per record, and a sum of all numerals in the node refers to the number of writes of the node. In the case of R-tree, data objects in the middle of the node is removed and moves to take one step to the left to keep the fill factor value of the node consistent, so the number of writes rapidly rises.

In step (a), all the data objects starting from data object E move to the newly created node to insert data object I into the node. When data object E moves from the left-side node to the right-side node in step (b), the other data objects F, G, H need to move one step to the left in the left-side node.

In step (c) to step (f), since data objects F, G, H, I also have to move one by one from the left-side node to the right-side node, the number of the writes with respect to a split index point node dramatically increases.

This problem may be solved by moving all elements of the node at once from the location of the split index, and it has an effect of reducing the number of the writes in the split node and simultaneously improving performance.

Prior to splitting the node in FIG. 3, the split algorithm figures out a point where the node splits. In order to find the split point, the algorithm does some rearranging of the elements within the node, which dramatically increases the number of writes.

FIG. 4 is a diagram of an example of node split. The example is to write a split node into a new node with the minimum number if writes. In detail, once the node successfully splits, PCR*-tree structure creates a new blank node and then copies the split node where all the rearrangements have been handled in this newly created node. It replaces the split node with the newly created node. A new node is an empty node with a minimum number of writes.

For this, an operation of designating a split point of a first node and an operation of moving data objects staring from the split point to the end of the first node to a second node are conducted.

As illustrated in FIG. 4(a), one example is a case to add data object I when a first node 201 is filled with 8 data objects A to H. In FIG. 4(b), a second node 202 and a third node 203 are created and 4 data objects A, B, C, D are rearranged in the second node 202 and 5 data objects E, F, G, H, I are rearranged in the third node 203. A split index point of the node may vary depending on the value of the inserted data objects.

That is, in PCR*-tree structure, when separating a node filled with data objects, each data object does not move one by one but all moves at once so that data objects are divided into two parts. After that, the split node is replaced with a newly created node. The created node is an empty node having a minimum number of writes. This method increases the number of writes one per updated data object, but it balances the number of the writes to PMC cells and keeps PCM cells usable as long as possible.

Figure 5:
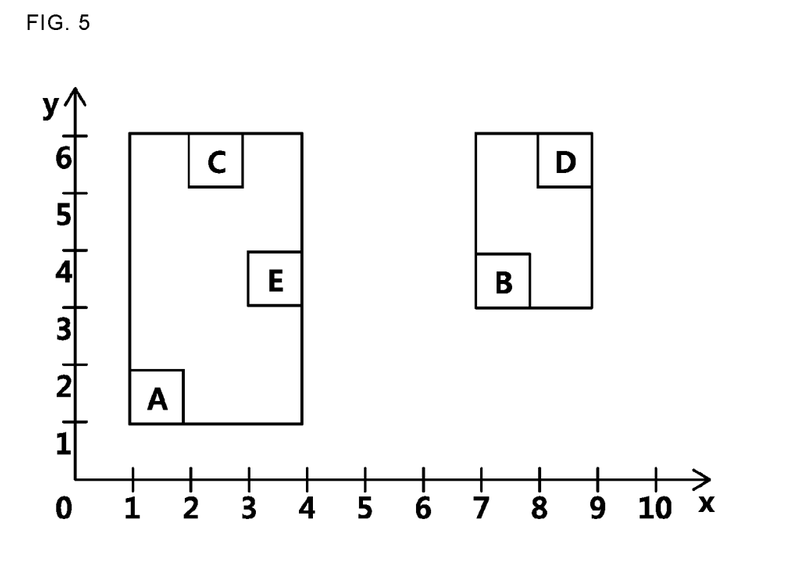
FIG. 5 is a diagram of minimum bounding rectangles enclosing all data objects.
Figure 6:
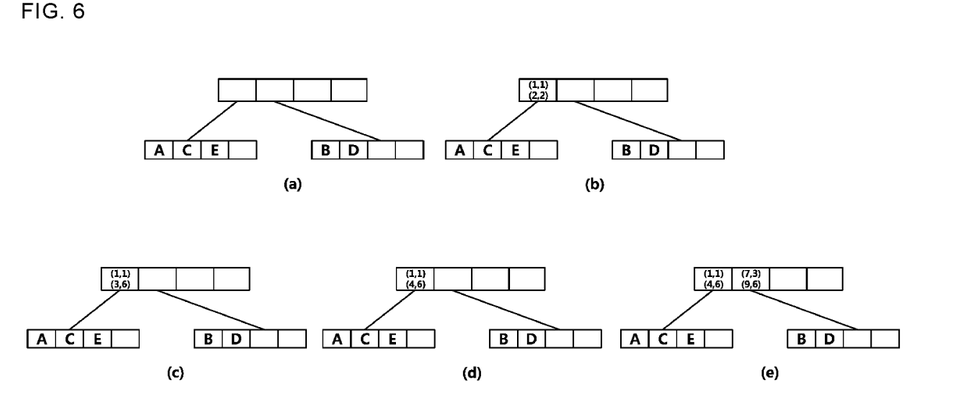
FIG. 6 is a diagram illustrating how a node is updated in a related art.

FIG. 5 is a diagram of minimum bounding rectangles enclosing all data objects. FIG. 6 is a diagram illustrating how a node is updated according to a related art.

If there is any change in a leaf node of a tree, it is necessary to update every parent node of the leaf node including its root node. However, since the durability decreases whenever a node is updated, it is necessary to minimize the number of writes.

In FIG. 5, it is possible to form a minimum bounding rectangle enclosing every data object, contain a point including the minimum bounding rectangle, and indicate the minimum bounding rectangle by the point. For example, when including only A as a data object, a bounding rectangle may be indicated by using points (1,1) and (2,2). Whenever moving a data object, the root node is changed in a related art. However, in examples of the present disclosure, the number of writes may be reduced by changing the point value of the root node after terminating the movement of every data object.

In FIG. 5 and FIG. 6, the root node is updated after modifications in the leaf nodes. Initially, it writes a master boot record (MBR) of data object A in a first minimum bounding rectangle, which is (1,1)(2,2), to its parent, as shown FIG. 6(b). Then, the MBR of data object C is compared with its parent's MBR, and the parent's MBR is updated again to (1,1)(3,6), as shown in FIG. 6(c). Likewise, the MBR of data object E is compared with its parent's MBR, and the parent's MBR is updated again to (1,1)(4,6), as shown in FIG. 6(d). Afterwards, a newly created second minimum bounding rectangle is updated after updating MBRs of all data objects included in the first minimum bounding rectangle. The MBR of data objects B and D are updated by a same process depicted in FIG. 6(a) to FIG. 6(d), and finally updated to (7,3)(9,6), as shown in FIG. 6(e).

The above process continues till the MBR of the parent node has been compared and updated with all the MBRs of the child node. In this example, the root node MBR will be modified two more times while updating a parent node with a neighboring leaf node.

However, according to the present disclosure, in order to reduce the number of writes, root node's MBR is modified directly from FIG. 6(b) to FIG. 6(e) after terminating the process of updating a parent node with a neighboring leaf node, not processed from FIG. 6(c) to FIG. 6(d). Thus, the number of writes may be reduced.

In the example of in the related art in FIG. 3 and FIG. 6(a) (e), the parent node's MBR has been updated five times since its maximum fill factor value is small. However, if a larger maximum fill factor value is used, the number of updates will increase and more writes will be required with the increase of the R-tree height.

However, in the present disclosure, when modifying data objects, forming a minimum bounding rectangle enclosing all the data objects; and comparing MBR values of leaf node data objects each other and calculating a MBR value of a root node, and then, writing the calculated values to the root node depicted from FIG. 6(b) directly to FIG. 6(e) above. In consequence, the one-time writing to the parent node enables a reduction in the number of writes.

Figure 7:
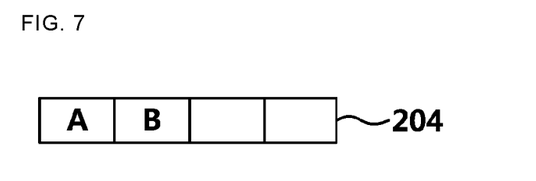
FIG. 7 is a diagram of an example of minimum fill factor requirements after deletion.

FIG. 7 is a diagram of an example of minimum fill factor requirements after deletion. In order to satisfy the minimum fill factor requirements of R-tree, after data objects have been deleted from an original node, the original node contains more left data objects than a minimum fill factor value (for example, half), if the original node contains less left data objects than a half of the number of data objects, the data objects of the node are merged with other nodes.

However, since the merge operation wastes the endurance of PCM and degrades the performance, it may be much better to merge nodes when they just become less than half full. In the merge operation, a node that does not meet the minimum fill factor requirement is deleted, and data objects of the deleted node are re-inserted to tree again; thus, the performance is degraded.

Therefore, the minimum fill factor requirement for the deletion of data is prohibited. In other words, it does not conduct the merge operation. In consequence, a retrieval time is not reduced, but the number of writes may be reduced.

As illustrated in FIG. 7, when two data objects A, B are stored in node 204 which can store four data objects and a minimum fill factor is two, if a data object B is deleted, the left data object A is not merged to the other data objects and is remained as it is. Since the number of nodes is not reduced, the time for retrieving data is not reduced, either, but the number of writes is reduced.

In addition, the use of the node 204 when another data object is used later may reduce the number of increasing writes during a splitting and merging processes.

Figure 8:
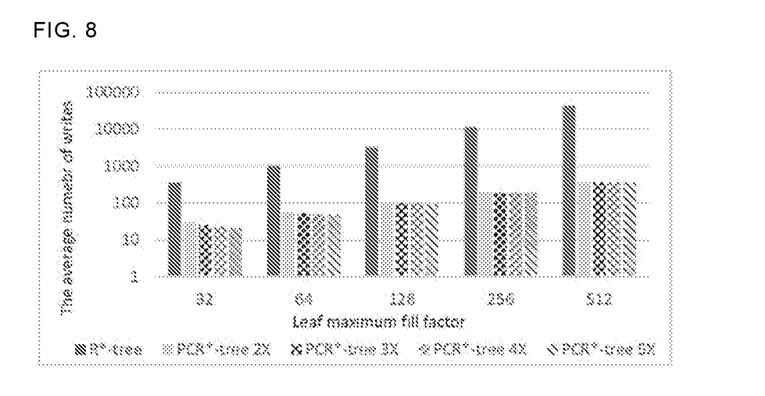
FIG. 8 is a graph of an example of an average number of writes.

FIG. 8 is a graph of an example of an average number of writes. This shows the average number of writes per node while deleting a random 500,000 elements from among ones inserted in a PCR*-tree and R-tree.

As illustrated in FIG. 8, the number of writes per node on average decreases by 80 times in the present disclosure for inserting. Postponing execution of the OverflowTreatment function by increasing the leaf node size, as well as optimized parent update and splitting mechanisms, helps to keep PCM cells usable as long as possible. It also decreases the number of writes during deletion by not merging the nodes if the minimum fill factor requirement is not met and also by updating the parent nodes only once (as the data are removed). It is verified that an operating method for a non-volatile memory of an example of the present disclosure reduces the number of writes.

Figure 9:
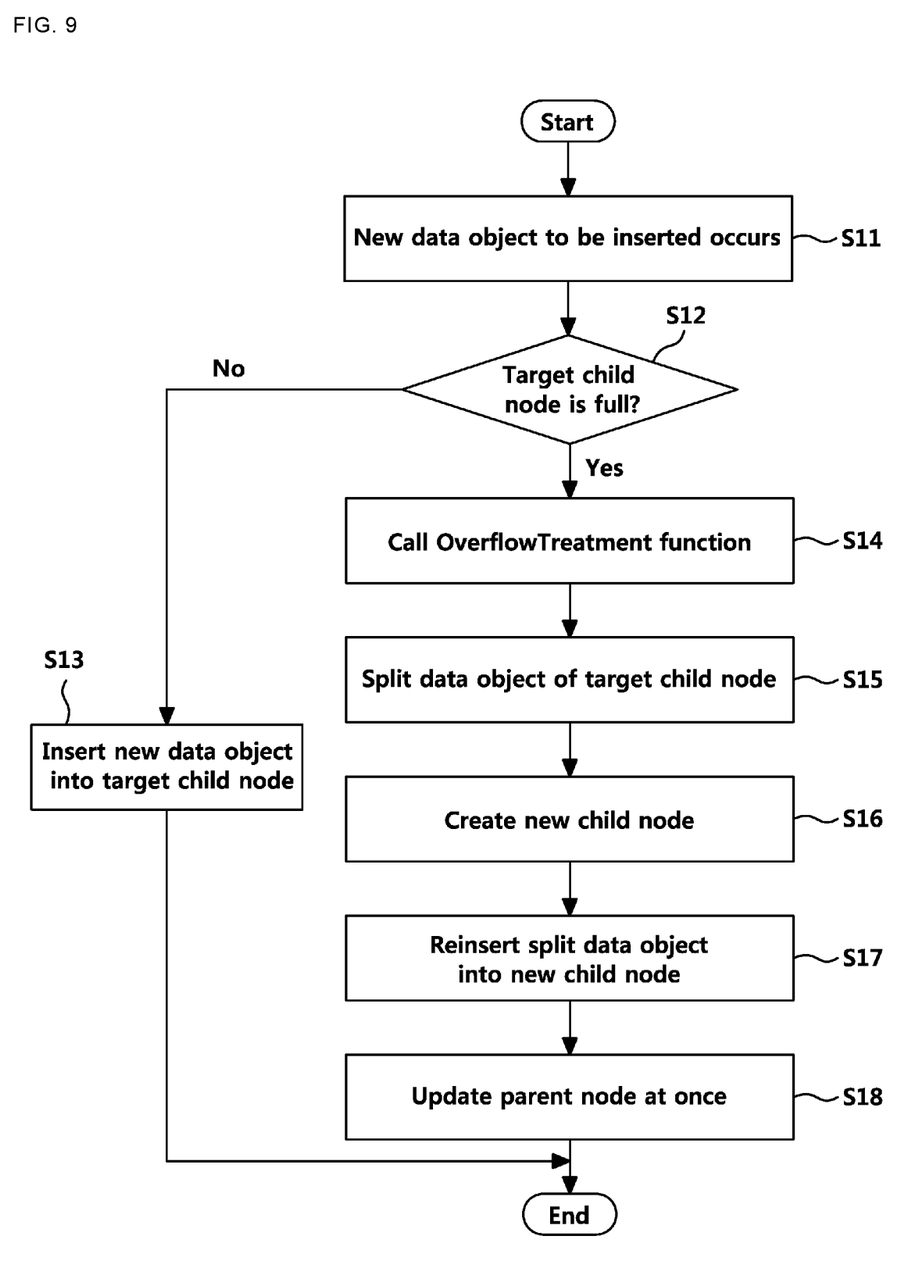
FIG. 9 is a flow chart of an example of an operating method for a non-volatile memory.

FIG. 9 is a flow chart of an example of an operating method for a non-volatile memory.

As illustrated in FIG. 9, the present disclosure includes an operation of checking whether a target child node is full or not (S12), when a new data object to be inserted occurs (S11); if the target child node is not full, an operation of inserting the new data object into the target child node (S13); if the target child node is full, an operation of calling OverflowTreatment function (S14); an operation of splitting data objects of the target child node (S15); an operation of creating a new child node (S16) an operation of reinserting the split data object into the new child node (S17); and an operation of updating a parent node corresponding to the child node at once (S18).

Figure 10:
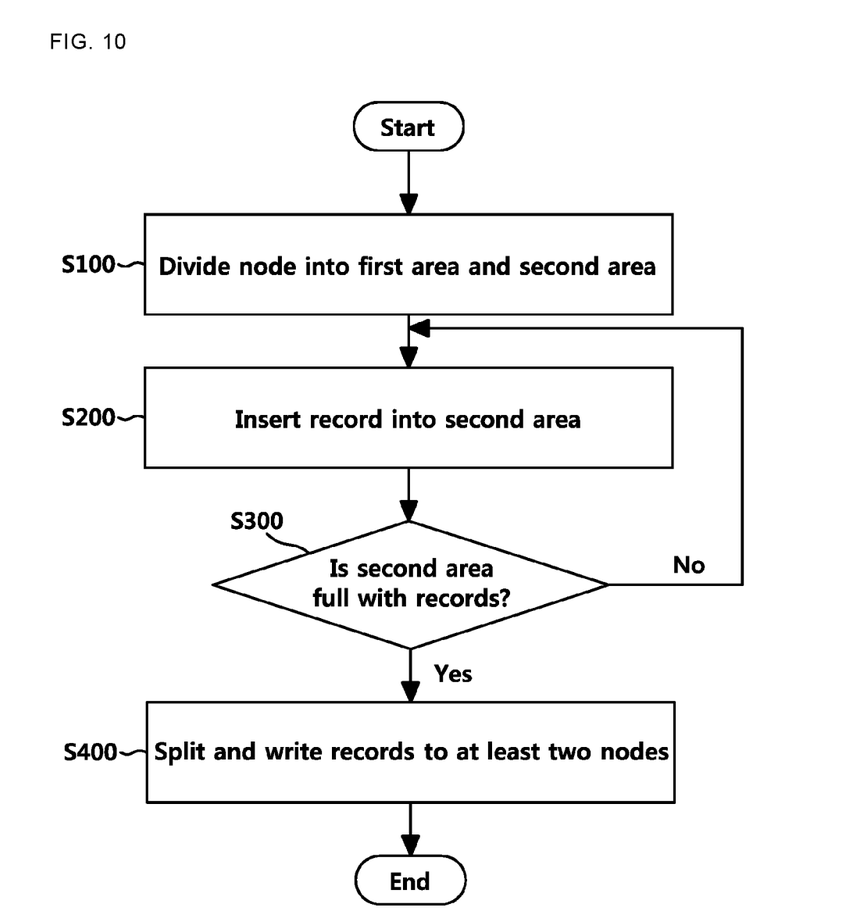
FIG. 10 is a flow chart of another example of an operating method for a non-volatile memory.

FIG. 10 is a flow chart of another example of an operating method for a non-volatile memory.

As illustrated in FIG. 10, the present disclosure includes an operation of dividing nodes into first area and second area (S100); and an operation of selecting and conducting one operation of inserting a specific key into each node, retrieving the specific key, and deleting the specific key from each node, but when a key value is newly inserted, it is stored in the second area first (S200).

At this time, the operation of inserting the key value determines whether the second area of the node is full (S300): if the second area is not full, the key value is inserted to the second area of the node; or, if the second area is full, data object is split and written to two or more nodes (S400).

When inserting the key value, the key moving to the first area of the node may be sorted in ascending or descending order.

As described above, the operating method for a non-volatile method according to the present disclosure applies a PCR*-tree structure to a data structure of non-volatile RAM, such as PCM, to reduce the sum of the number of writes and at the same time, the method prevents the writes from being repeatedly executed at a specific area to improve the endurance of the non-volatile RAM such as PMC and improve data processing performance.

In addition, the present disclosure describe examples of PCR*-tree data structure, but it is not limited to PCR*-tree and it may be applied to R-tree, R+-tree, or R*-tree as well.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:

1. Operating method for a non-volatile memory, wherein the non-volatile memory comprises:
at least one non-leaf node; and
at least one leaf node that stores a data object corresponding to the non-leaf node and has a variable size of n multiple of the non-leaf node, n being a natural number, the method comprising:
when a target leaf node to insert at least one new data object is fully filled, creating at least one leaf node; splitting data objects from a split index point in the target leaf node; and reinserting the split data objects into the created leaf node at once.

2. The operating method of claim 1, wherein the splitting data object comprises configuring the split index point based on number of the inserted data objects.

3. The operating method of claim 1, wherein the created at least one leaf node is an empty node with a minimum number of writes.

4. The operating method of claim 1, wherein the at least one data object stored in the non-leaf node is a point value of a bounding rectangle of data objects stored in the leaf node.

5. The operating method of claim 4, wherein the bounding rectangle has a minimum size including all data objects stored in the leaf node.

6. The operating method of claim 4, wherein the point value of the bounding rectangle is Master Boot Record (MBR) of the leaf node.

7. The operating method of claim 6, further comprising updating each MBR stored in the non-leaf node at once after the reinserting.

8. The operating method of claim 1, further comprising, when the number of the left data objects in the leaf node are less than or equal to a minimum fill factor value after deletion, not merging the left data objects into another leaf node.

9. The operating method of claim 8, wherein, when at least one new data object is inserted, the new data object is inserted into the target leaf node.

10. The operating method of claim 1, wherein the non-volatile memory is a Phase Change Memory.

11. A non-volatile memory, comprising:
at least one parent node; and
at least one child node that stores a data object and has a variable size of n multiple of the parent node, n being a natural number,
when a target child node to insert at least one new data object is fully filled,
wherein the data objects of the target child node are split and reinserted into newly created at least one child node.

12. The non-volatile memory of claim 11, wherein, when the number of left data objects in the target child node is less than or equal to a minimum fill factor value, the left data objects are not merged in another child node.

13. The non-volatile memory of claim 11, wherein the newly created child node is an empty node with a minimum number of writes.

14. The non-volatile memory of claim 11, wherein a split index point in the target child node is configured based on number of the inserted data objects.

15. The non-volatile memory of claim 11, wherein the parent node is a point value of bounding rectangle of data objects in the child node.

16. The non-volatile memory of claim 15, wherein the point value of the bounding rectangle is a Master Boot Record (MBR) of the child node.

17. The non-volatile memory of claim 11, wherein the MBR in the parent node is updated at once after the reinserting.

18. An operating method for a non-volatile memory, comprising:
    when a child node is full to insert at least one data object, designating a split index point of the child node based on the data object;
    creating a new child node; and
    moving all data objects starting from the split index point to the new node at once.

19. The operating method of claim 18, further comprising:
    forming, when the child nodes are modified, a minimum bounding rectangle enclosing all of the data objects;
    comparing a master boot record (MBR) value of the child node in a parent node after modifying all nodes; and
    updating the MBR in the parent node at once.

* * * * *